(12) United States Patent
Shu (10) Patent No.: US 11,688,177 B2
(45) Date of Patent: Jun. 27, 2023

(54) OBSTACLE DETECTION METHOD AND DEVICE, APPARATUS, AND STORAGE MEDIUM

(71) Applicant: Beijing Baidu Netcom Science and Technology Co., Ltd., Beijing (CN)

(72) Inventor: Mao Shu, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 179 days.

(21) Appl. No.: 17/141,997

(22) Filed: Jan. 5, 2021

(65) Prior Publication Data

US 2021/0374439 A1  Dec. 2, 2021

(30) Foreign Application Priority Data

May 29, 2020 (CN) .......................... 202010477558.4

(51) Int. Cl.
*G06T 7/73* (2017.01)
*G06V 20/58* (2022.01)

(52) U.S. Cl.
CPC ............... *G06V 20/58* (2022.01); *G06T 7/73* (2017.01); *G06T 2207/30261* (2013.01)

(58) Field of Classification Search
CPC .. G06T 7/30; G06T 7/33; G06T 7/337; G06T 7/55; G06T 7/70; G06T 7/73; G06T 7/74;
(Continued)

(56) References Cited

U.S. PATENT DOCUMENTS

2018/0268601 A1* 9/2018 Rad et al. ............. G06K 9/6256
2020/0018994 A1* 1/2020 Nieuwenhuis et al. ..................... G06N 20/00

(Continued)

FOREIGN PATENT DOCUMENTS

CN    106227218 A    12/2016
CN    106441275 A    2/2017
(Continued)

OTHER PUBLICATIONS

European Patent Office; European Search Report; EP Application No. 21164277.2; dated Sep. 14, 2021; 11 pages.
(Continued)

*Primary Examiner* — Andrew W Johns
(74) *Attorney, Agent, or Firm* — Faegre Drinker Biddle & Reath LLP (57) ABSTRACT

An obstacle detection method and device, an apparatus and a storage medium are provided, which are related to a field of intelligent transportation. The specific implementation includes: acquiring position information of a two-dimensional (2D) detection frame and position information of a three-dimensional (3D) detection frame of an obstacle in an image; converting the position information of the 3D detection frame of the obstacle into position information of a 2D projection frame of the obstacle; and optimizing the position information of the 3D detection frame of the obstacle by using the position information of the 2D detection frame, the position information of the 3D detection frame and the position information of the 2D projection frame of the obstacle in the image. Accuracy of results of predicting a 3D position of an obstacle by a roadside, on-board sensing device, or other sensing devices may be improved.

18 Claims, 8 Drawing Sheets

(58) Field of Classification Search
CPC . G06T 7/97; G06T 2207/30261; G06V 20/58; G05D 1/0231; G05D 1/0238; G05D 1/0246
See application file for complete search history.

(56) References Cited

U.S. PATENT DOCUMENTS

| | | | |
|---|---|---|---|
| 2020/0143557 A1 | 5/2020 | Choi et al. | |
| 2021/0174537 A1* | 6/2021 | Ye et al. | G06K 9/6267 |
| 2022/0172429 A1* | 6/2022 | Tong et al. | G06T 7/70 |

FOREIGN PATENT DOCUMENTS

| | | | |
|---|---|---|---|
| CN | 109737974 A | 5/2019 | |
| CN | 109948505 A | 6/2019 | |
| CN | 110286387 A | 9/2019 | |
| CN | 111008935 A | 4/2020 | |
| CN | 111079619 A | 4/2020 | |
| CN | 111079685 A | 4/2020 | |

OTHER PUBLICATIONS

Liu, Lijie et al.; Deep Fitting Degree Scoring Network for Monocular 3D Object Detection; 2019 IEEE/CVF Conference on Computer Vision and Pattern Recognition (CVPR); pp. 1057-1066; Jun. 15, 2019.
European Patent Office; European Office Action; EP Application No. 21164277.2; dated Jun. 22, 2022; 7 pages.
Mousavian, Arsalan et al.; 3D Bounding Box Estimation Using Deep Learning and Geometry; 2017 IEEE Conference on Computer Vision and Pattern Recognition (CVPR); Jul. 21, 2017; 9 pages.
Korean Patent Office; Korean Office Action; Korean Application No. 10-2021-0038016; dated Jun. 29, 2022; 10 pages.
Japanese Patent Office; Japanese Office Action; Japanese Application No. 2021-086756; dated Sep. 20, 2022; 8 pages.
The State Intellectual Property Office of People's Rebulic of China; Chinese Office Action and Search Report; Chinese Application No. 202010477558.4; dated Mar. 16, 2023; 19 pages.

\* cited by examiner

OBSTACLE DETECTION METHOD AND DEVICE, APPARATUS, AND STORAGE MEDIUM

CROSS-REFERENCE TO RELATED APPLICATION

This application claims priority to Chinese patent application No. 202010477558.4, entitled "Obstacle Detection Method and Device, Apparatus, and Storage Medium", filed with the Chinese Patent Office on May 29, 2020, which is hereby incorporated by reference in its entirety.

TECHNICAL FIELD

The present application relates to a field of intelligent transportation, and in particular, to a field of obstacle detection.

BACKGROUND

In an aspect of a roadside perception of intelligent transportation, a two-dimensional (2D) detection frame in an image and a three-dimensional (3D) position in a world coordinate system of an obstacle may be obtained by means of a 2D object detection and a 3D object detection algorithm, where the accuracy of the roadside perception depends on the accuracy of the 3D position.

SUMMARY

An obstacle detection method and device, an apparatus and a storage medium are provided according to the present application.

According to an aspect of the present application, an obstacle detection method is provided. The method includes:

acquiring position information of a two-dimensional detection frame and position information of a three-dimensional detection frame of an obstacle in an image:

converting the position information of the three-dimensional detection frame of the obstacle into position information of a two-dimensional projection frame of the obstacle;

optimizing the position information of the three-dimensional detection frame of the obstacle by using the position information of the two-dimensional detection frame, the position information of the three-dimensional detection frame and the position information of the two-dimensional projection frame of the obstacle in the image.

According to another aspect of the present application, an obstacle detection device is provided. The device includes:

an acquisition module, configured to acquire position information of a two-dimensional detection frame and position information of a three-dimensional detection frame of an obstacle in an image;

a conversion module, configured to convert the position information of the three-dimensional detection frame of the obstacle into position information of a two-dimensional projection frame of the obstacle:

an optimization module, configured to optimize the position information of the three-dimensional detection frame of the obstacle by using the position information of the two-dimensional detection frame, the position information of the three-dimensional detection frame and the position information of the two-dimensional projection frame of the obstacle in the image.

According to yet another aspect of the present application, an electronic apparatus is provided. The electronic apparatus includes:

at least one processor; and a memory communicatively connected to the at least one processor, wherein the memory stores instructions executable by the at least one processor, the instructions are executed by the at least one processor to enable the at least one processor to perform the method provided according to any one of embodiments of the present application.

According to yet another aspect of the present application, a non-transitory computer readable storage medium for storing computer instructions is provided. The computer instructions, when executed by a computer, cause the computer to perform the method provided according to any one of embodiments of the present application.

It should be understood that the content described herein is not intended to denote key or critical elements of embodiments of the present application nor to limit the scope of the present application. Further features of the present application may be readily understood from the following description.

BRIEF DESCRIPTION OF THE DRAWINGS

The drawings are used to better understand the scheme and do not constitute a limitation to the present application, wherein.

DETAILED DESCRIPTION

The exemplary embodiments of the application will be described below in combination with drawings, including various details of the embodiments of the present application to facilitate understanding, which should be considered as exemplary only. Therefore, those of ordinary skill in the art should realize that various changes and modifications can be made to the embodiments described herein without departing from the scope and spirit of the present application.

Likewise, descriptions of well-known functions and structures are omitted in the following description for clarity and conciseness.

Figure 1:
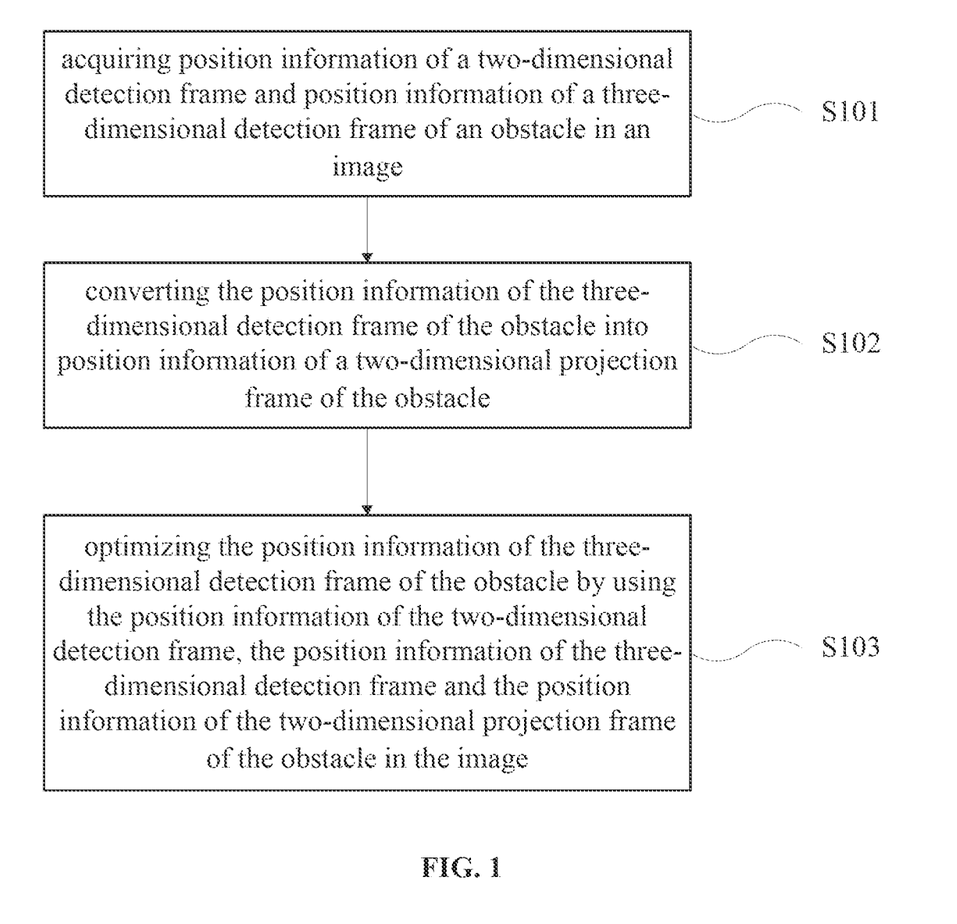
FIG. 1 is a flowchart showing an obstacle detection method according to an embodiment of the present application.

FIG. 1 is a flowchart showing an obstacle detection method according to an embodiment of the present application. The method may include:

S101, acquiring position information of a two-dimensional detection frame and position information of a three-dimensional detection frame of an obstacle in an image.

S102, converting the position information of the three-dimensional detection frame of the obstacle into position information of a two-dimensional projection frame of the obstacle.

S103, optimizing the position information of the three-dimensional detection frame of the obstacle by using the position information of the two-dimensional detection frame, the position information of the three-dimensional detection frame and the position information of the two-dimensional projection frame of the obstacle in the image.

An image according to embodiments of the present application may include frame images from videos, photos and the like. For example, frame images from videos shot by an on-board camera (also referred to as a video camera), photos taken by a mobile phone and the like. Images may contain various types of obstacles. There are many methods for detecting obstacles. For example, a detection model applicable for identifying one or more types of obstacles may be obtained by training a neural network and the like. The detection model is then used to detect an image, to obtain position information of a two-dimensional (2D) detection frame and position information of a three-dimensional (3D) detection frame of an obstacle. An obstacle detection model applicable for obtaining a 2D detection frame and a 3D detection frame may be either the same as or different from the above detection model. Position information of a 2D detection frame may include a coordinate of a 2D detection frame where an obstacle is located, such as the coordinates of the top left corner and the bottom right corner. Position information of a 3D detection frame may include a coordinate, a size, an orientation angle and the like of a 3D detection frame where an obstacle is located.

Figure 3:
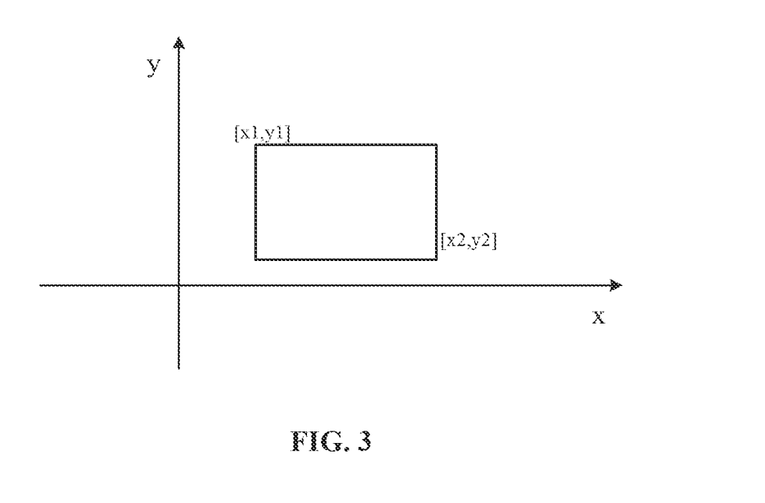
FIG. 3 is a schematic diagram showing a two-dimensional detection frame.
Figure 4:
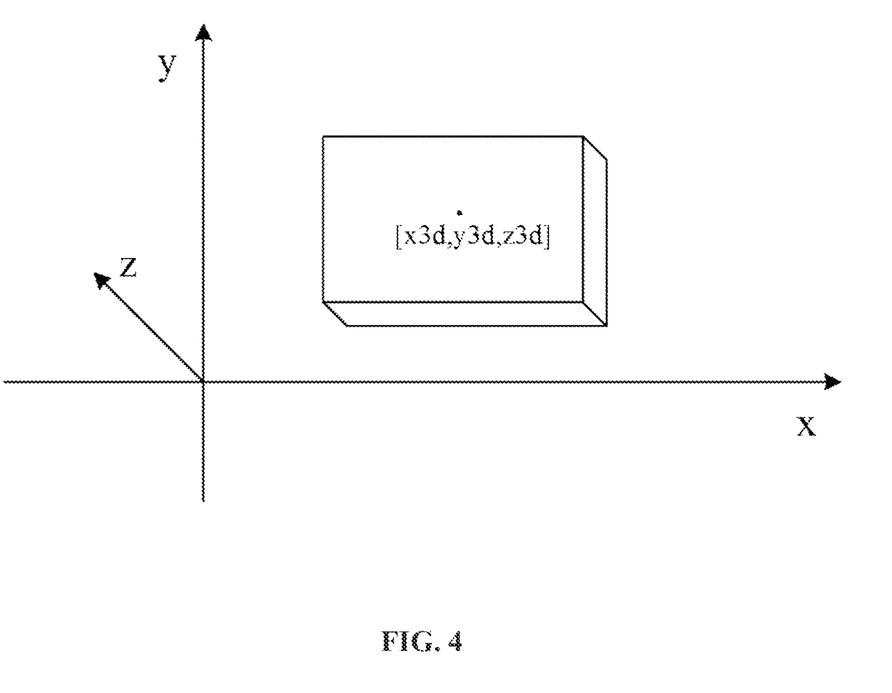
FIG. 4 is a schematic diagram showing a three-dimensional detection frame.

For example, as shown in FIG. 3, position information of a 2D detection frame of an obstacle A may be identified in the image as [x1,x2,y1,y2] by using a 2D obstacle detection model, where [x1,y1] may be coordinate of the top left corner of the 2D detection frame of the obstacle, and [x2,y2] may be coordinate of the bottom right corner of the 2D detection frame of the obstacle. For another example, as shown in FIG. 4, position information of a 3D detection frame of the obstacle A may be identified in the image by using a 3D obstacle detection model, including: coordinates of a central point of the 3D detection frame in a camera coordinate system [x3d,y3d,z3d], coordinates of length, width and height [w3d,h3d,l3d], and a Y-axis orientation angle ry3d.

By projecting a position of a 3D detection frame, position information of the 3D detection frame of an obstacle may be converted into position information of a 2D projection frame of the obstacle. For example, if a 3D detection frame is a rectangular parallelepiped, 2D projection points corresponding to the eight vertices of the rectangular parallelepiped may be obtained by calculation using a projection formula. An example of the projection formula is as follows:

$x = KX,$ where k represents a parameter matrix within a camera, x represents coordinates [x, y] of a 2D projection point, and X represents coordinates [x, y, z] of a 3D point.

After corresponding 2D projection points are obtained by performing a calculation on respective vertexes of the 3D detection frame, a 2D projection frame may be obtained based on the obtained 2D projection points. The 2D projection frame may contain all 2D projection points of the 3D detection frame. For example, based on the coordinates of the eight 2D projection points of the 3D detection frame, the maximum value $x_{max}$ and the minimum value $x_{min}$ of the 2D projection frame on the x-axis, and the maximum value $y_{max}$ and the minimum value $y_{min}$ on the y-axis may be obtained. The position information of the 2D projection frame [$x_{max}$, $x_{min}$, $y_{max}$, $y_{min}$] may be further obtained.

Then, based on one or more of position information of a 2D detection frame, position information of a 3D detection frame, and position information of a 2D projection frame of an obstacle in an image, a loss function is constructed. After the coordinates and the axial angle of the 3D detection frame of the obstacle are adjusted, the position information of the 3D detection frame of the obstacle may be optimized by calculating loss based on the loss function.

Based on the present application, position information of a 3D detection frame of an obstacle is optimized by using position information of a 2D detection frame, position information of a 3D detection frame and position information of a 2D projection frame of an obstacle in an image, so that accuracy of results of predicting a 3D position of an obstacle by a roadside, on-board sensing device, or other sensing devices may be improved. For example, the obstacle detection method according to an embodiment of the present application may be applied to a scene where a position of a 3D obstacle is sensed at roadside, and may also be applied to a scene where an on-board camera or other surveillance cameras and the like are applicable.

Figure 2:
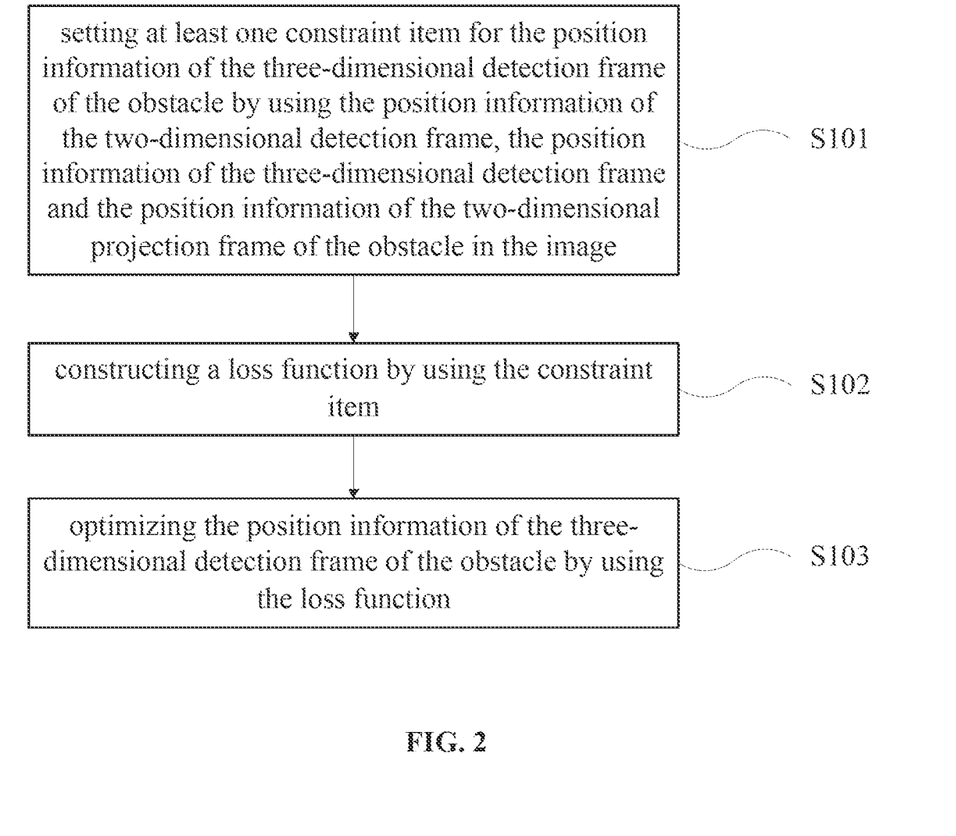
FIG. 2 is a flowchart of an obstacle detection method according to another embodiment of the present application.

FIG. 2 is a flowchart of an obstacle detection method according to another embodiment of the present application. The obstacle detection method according to the embodiment may include respective steps of the above embodiment.

In this embodiment, at S103, the optimizing the position information of the three-dimensional detection frame of the obstacle by using the position information of the two-dimensional detection frame, the position information of the three-dimensional detection frame and the position information of the two-dimensional projection frame of the obstacle in the image may include:

S201, setting at least one constraint item for the position information of the three-dimensional detection frame of the obstacle by using the position information of the two-dimensional detection frame, the position information of the three-dimensional detection frame and the position information of the two-dimensional projection frame of the obstacle in the image;

S202, constructing a loss function by using the constraint item;

S203, optimizing the position information of the three-dimensional detection frame of the obstacle by using the loss function.

By analyzing prediction results, the prediction result of a 2D detection frame of an obstacle is closer to a truth value. setting at least one constraint item by using the position information of the 2D detection frame, the position information of the 3D detection frame and the position information of the 2D projection frame of the obstacle helps to make the 3D position of the obstacle more consistent with the prediction result of the 2D position, thereby improving the accuracy of the prediction result of the 3D position of an obstacle.

In a possible implementation, the constraint item includes a first constraint item, which is set according to coordinates of a central point of the 2D detection frame and coordinates of a central point of the 2D projection frame of the obstacle. The first constraint item is set based on coordinates of central points of the 2D detection frame and the 2D projection frame of an obstacle, and a loss function is then constructed based on the first constraint item. It is expected that the central point of the 2D projection frame is as close as possible to, even overlapped with, the central point of the 2D detection frame, so that results of predicting a 3D position of an obstacle by a roadside, on-board sensing device, or other sensing devices will be more accurate.

In a possible implementation, the constraint item further includes a second constraint item, which is set according to coordinates of left and right sides of the 2D detection frame and coordinates of left and right sides of the 2D projection frame of the obstacle. The second constraint item is set based on the coordinates of the left and right sides of the 2D detection frame and of the 2D projection frame of an obstacle, and a loss function is constructed based on the second constraint item. It is expected that the left and the right sides of the 2D projection frame are as close as possible to, even overlapped with, the left and the right sides of the 2D detection frame, respectively, so that results of predicting a 3D position of an obstacle by a roadside, on-board sensing device, or other sensing devices will be more accurate.

In a possible implementation, the constraint item further includes a third constraint item, which is set according to coordinates of projection points of the 3D detection frame of the obstacle. The third constraint item is set based on the coordinates of the projection points of the 3D detection frame, and a loss function is constructed based on the third constraint item, which helps to control the adjustment range of optimization, so that results of predicting a 3D position of an obstacle by a roadside, on-board sensing device, or other sensing devices will be more accurate.

The loss function can be built based on any one or two or all of the foregoing first constraint item, second constraint item, and third constraint item. By applying multiple constraint items, conditions that an optimal solution should satisfy may be sufficiently taken into account, so that the probability of missing an optimal solution is reduced, and a more accurate prediction result of the 3D position of an obstacle is obtained.

Figure 5:
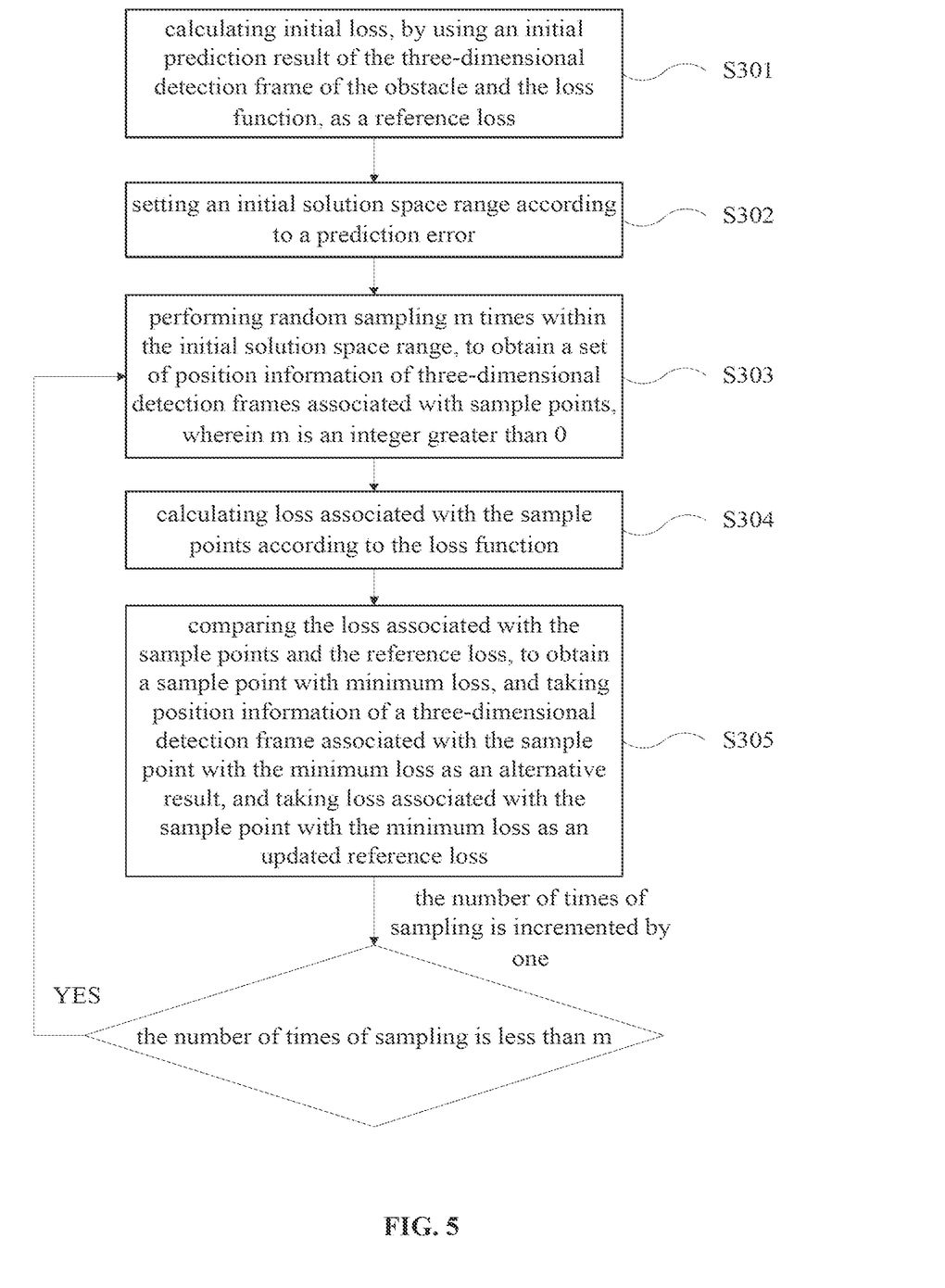
FIG. 5 is a flowchart of an obstacle detection method according to yet another embodiment of the present application.

FIG. 5 is a flowchart of an obstacle detection method according to yet another embodiment of the present application. The obstacle detection method according to the embodiment may include respective steps of any one of the above embodiments.

In this embodiment, at S203, the optimizing the position information of the three-dimensional detection frame of the obstacle by using the loss function may include:

S301, calculating initial loss, by using an initial prediction result of the three-dimensional detection frame of the obstacle and the loss function, as a reference loss.

S302, setting an initial solution space range according to a prediction error. For example, if the position information of a 3D detection frame of an obstacle contains four adjustable variables: 3D coordinates [x3d,y3d,z3d], and the orientation angle ry3d. 3D prediction results are obtained in advance based on data with truth values, errors between the truth values and the prediction values are calculated, and the mean of the errors $[x3d_{mean}, y3d_{mean}, z3d_{mean}, ry3d_{mean}]$ is then calculated statistically, and further taken as a priori error, i.e., a forecast error. In use, an initial 3D prediction result [x3d,y3d,z3d,ry3d] is obtained based on data without truth values. Then, the solution space of x3d is $[x3d_{min}=x3d-x3d_{mean}, x3d_{max}=x3d+x3d_{mean}]$, and the other three variables are similar:

the solution space of $y3d$ is $[y3d_{min}=y3d-y3d_{mean}, y3d_{max}=y3d+y3d_{mean}]$, the solution space of $z3d$ is $[z3d_{min}=z3d-z3d_{mean}, z3d_{max}=z3d+z3d_{mean}]+$ the solution space of $ry3d$ is $[ry3d_{min}=ry3d-ry3d_{mean}, ry3d_{max}=ry3d-ry3d_{mean}]$.

S303, performing random sampling m times within the initial solution space range, to obtain a set of position information of three-dimensional detection frames associated with sample points, wherein m is an integer greater than 0.

S304, calculating loss associated with the sample points according to the loss function. For example, a set of position information of the 3D detection frame associated with the sample points obtained in the previous step is substituted into the loss function, to obtain the loss corresponding to the sample points.

S305, comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss. When comparing the loss associated with the sample point with the initial loss for the first time, if it is determined that the loss associated with the sample point is less than the initial loss, the loss associated with the sample point is taken as an updated reference loss. Then, loss associate with sample points obtained by new sampling may be compared with the updated reference loss. In contrary, if the loss associated with the sample point is no less than the initial loss, the reference loss is maintained unchanged, and is still used for a next comparison. Each sampling is performed, the number of times of sampling is incremented by one, until the number of times of random sampling is equal to m. Further, when the number of times of random sampling is equal to m, the number of times of resampling is incremented by one.

By applying an embodiment of the present application, a random search in an initial solution space of a 3D detection frame increases the sampling rate of optimal solutions. Compared with the accuracy and precision of initial detection results, the accuracy and precision of final search results are greatly improved.

Figure 6:
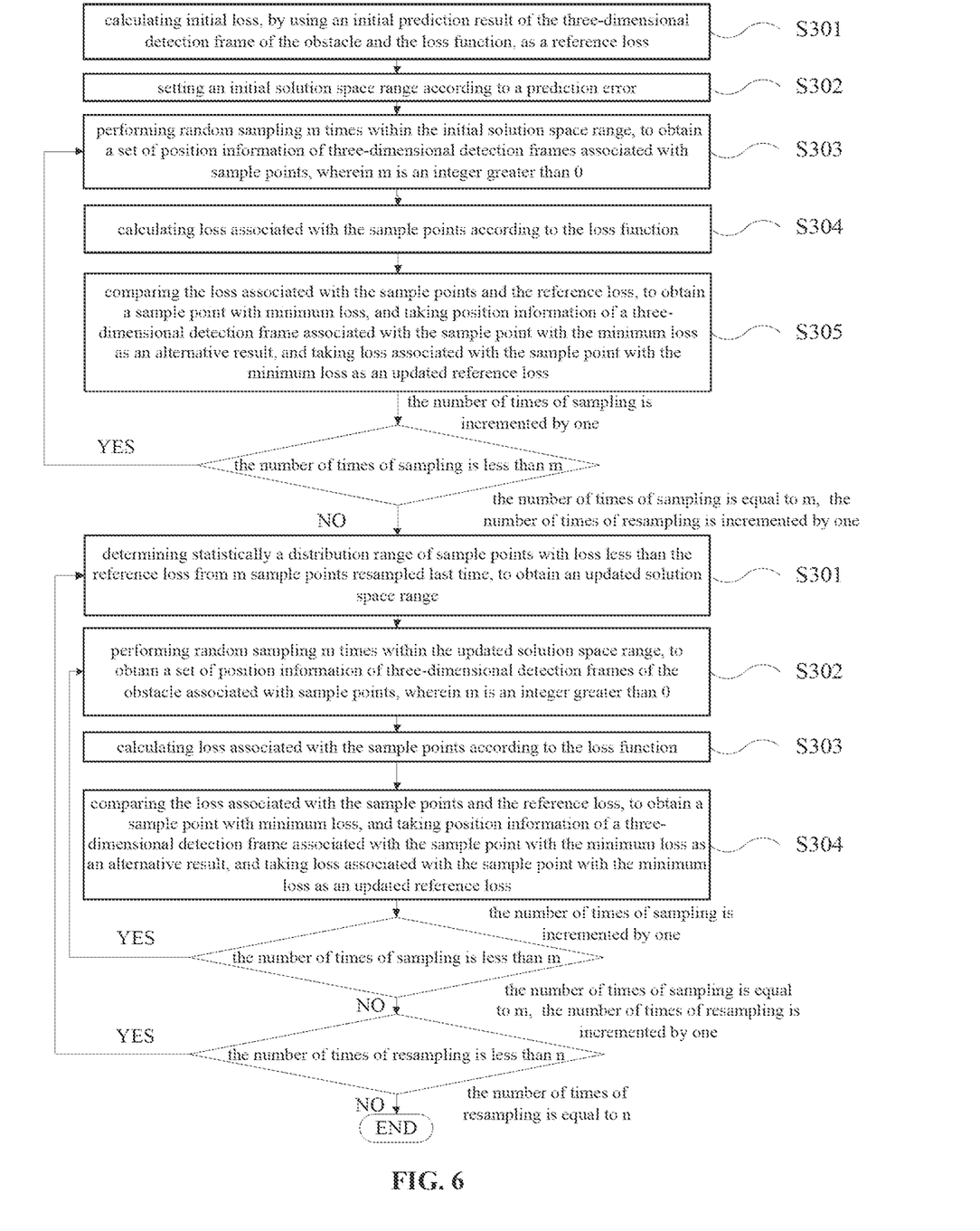
FIG. 6 is a flowchart of an obstacle detection method according to yet another embodiment of the present application.

FIG. 6 is a flowchart of an obstacle detection method according to yet another embodiment of the present application. The obstacle detection method according to the embodiment may include respective steps of any one of the above embodiments.

In this embodiment, in S203, after S305, the optimizing the position information of the three-dimensional detection frame of the obstacle by using the loss function may further include performing steps S306 to S310 repeatedly for n−1 times, wherein n represents a number of times resampling is performed:

S306, determining statistically a distribution range of sample points with loss less than the reference loss from m sample points resampled last time, to obtain an updated solution space range. For example, coordinates of a central point in 3D position information and the minimum value and the maximum value of an orientation angle are obtained based on the in sample points resampled last time, and an updated solution space range is obtained based on the forecast error.

S307, performing random sampling in times within the updated solution space range, to obtain a set of position information of three-dimensional detection frames of the obstacle associated with sample points, wherein in is an integer greater than 0.

S308, calculating loss associated with the sample points according to the loss function. For example, a set of position information of a 3D detection frame of sample points obtained in a previous step is substituted into the loss function, to obtain the loss associated with the sample points.

S309, comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

From S307 to S309, alternatively, it is also possible to substitute, a set of position information of a 3D detection frame of an obstacle associated with a sample point into the loss function, after obtaining a sample point by performing sampling for each time, to calculate the loss associated with the sample point. Then, it is determined whether the alternative result and the reference loss should be updated, by comparing the calculated result with the previous alternative result. If an update should be performed, the updated alternative result and reference loss are taken as reference values for a next sample point to perform comparison. If an update should not be performed, the alternative result and the reference loss are kept unchanged as the reference values for a next sample point to perform comparison. A set of position information of a 3D detection frame of the obstacle associated with the next sample point is substituted into the loss function, to calculate the loss associated with the sample point. A comparison is continued to determine the alternative result and the reference loss, until the number of sampling is equal to m.

Further, each time m sample points are obtained by sampling, the number of times of resampling is incremented by one. The number of time of resampling may be determined, that is, it is determined whether the number of times of resampling is greater than or equal to n. If the number of times of resampling is less than n, it may return to S306, and the resampling process continues, until the number of times of resampling is equal to n, where n is a positive integer. The value of n may be set according to specific requirements. Generally speaking, the larger the value of n, the higher the accuracy and precision.

For example, after S303 is executed, the number of times of resampling is one. After S308 is executed for the first time, the number of times of resampling is two. Thereafter, each time S308 is executed, the number of times of resampling is incremented by one, and the process continues until the number of times of resampling is equal to n. The alternative result obtained the last time may be referred to as final optimal position information of the 3D detection frame of an obstacle.

By applying embodiments of the present application, resampling of a solution space of a 3D detection frame of an obstacle is performed multiple times, therefore, the sampling rate of an optimal solution is further increased, so that the accuracy and precision of results of predicting a 3D position of an obstacle by a roadside, on-board sensing device, or other sensing devices are further improved.

In an application example, geometric constraints are constructed based on the image-forming principle of cameras according to an embodiment of the present application, prediction results of a 2D detection frame and prediction results of a 3D detection frame are balanced, thereby realizing a back-end optimization of results of a 3D detection.

An obstacle detection is performed on an image, to obtain position information of a 2D detection frame and of a 3D detection frame of a certain obstacle, and then the position information is entered into an optimization algorithm. For example, inputs of the optimization algorithm include: coordinates of 2D detection frame [x1,x2,y1,y2], coordinates of a central point of the 3D detection frame in a camera coordinate system [x3d,y3d,z3d], the length, width and height [w3d,h3d,l3d], and the y-axis orientation angle ry3d. Further, the inputs of the optimization algorithm also include a camera intrinsic parameter matrix p2 and the ground equation de_norm. The optimization target is the four degrees of freedom of x3d, y3d, z3d, and ry3d.

Constraint Item 1: by analyzing prediction results, the prediction result of a 2D detection frame is much closer to a truth value. The 2D projection frame is obtained according to a projection relationship, based on the prediction result of a 3D detection frame. When the position is correct, because the length, width and height [w3d,h3d,l3d] does not fall within the scope of optimization, the 2D detection frame cannot be completely overlapped with the 2D projection frame due to a forecast error, however, it is expected that they may be overlapped. Therefore, exemplarily, the Constraint Item 1 err1 is:

$$err1=|(x1_{pro}+x2_{pro})-(x1+x2)+|(y1_{pro}+y2_{pro})-(y1+y2),$$

where $[x1_{pro},x2_{pro},y1_{pro},y2_{pro}]$ represents coordinates of the 2D projection frame of the 3D detection frame, and [x1,x2,y1,y2] represents coordinates of the 2D detection frame.

Constraint Item 2: on the basis that the central points are overlapped, in order to further restrain the deviation of the orientation angle, it is expected that the left and right sides of the 2D detection frame are overlapped with those of the 2D projection frame. Therefore, exemplarily, the Constraint Item 2 err2 is:

$$err2=|x1_{pro}-x1|+|x2_{pro}-x2|.$$

Constraint Item 3: given that the value of the 2D detection frame generated by the orientation angle fry in Constraint Item 1 is the same as that in Constraint Item 2, and because the deviation of the prediction result of the 3D detection frame is usually not large, in order to further control the range of optimization, an example of the Constraint Item 3 err3 is:

$$err3=\Sigma_{i=1}^{8}|v_i-\hat{v}_i|.$$

where $v_i$ represents coordinates of projection points of prediction results of the initial 3D detection frame, and $\hat{v}_i$ represents coordinates of projection points of prediction results of the adjusted 3D detection frame. For example, if the 3D detection frame is a rectangular parallelepiped, the coordinates of the projection points of the 3D detection frame contain eight 2D coordinates, i.e. $v_i$ and $\hat{v}_i$ are vectors including x-axis coordinates and y-axis coordinates.

According to the above constraint items, an exemplary loss function err is:

$$err=err1+\alpha\times err2+\beta\times err3,$$

where α, β are hyperparameters, which may be preset values.

According to embodiments of the present application, a method for solving an optimal point based on the above loss function is provided. Firstly, an initial loss of is calculated based on an initial prediction result. A forecast error of x3d,y3d,z3d,ry3d is then calculated statistically, and an initial solution space is set according to the forecast error. Secondly, random sampling is performed m times within the solution space range, the loss $\widehat{ol}$ is calculated, and the distribution range of all points $\widehat{ol}$ of that is less than of is calculated statistically, and the calculated distribution range is then taken as an updated solution space. Thirdly, a point with minimum value of $\widehat{ol}$ taken as the alternative result, and the $\widehat{ol}$ is set as an updated ol. A final result is obtained then by performing the foregoing steps for n−1 times repeatedly.

Figure 7:
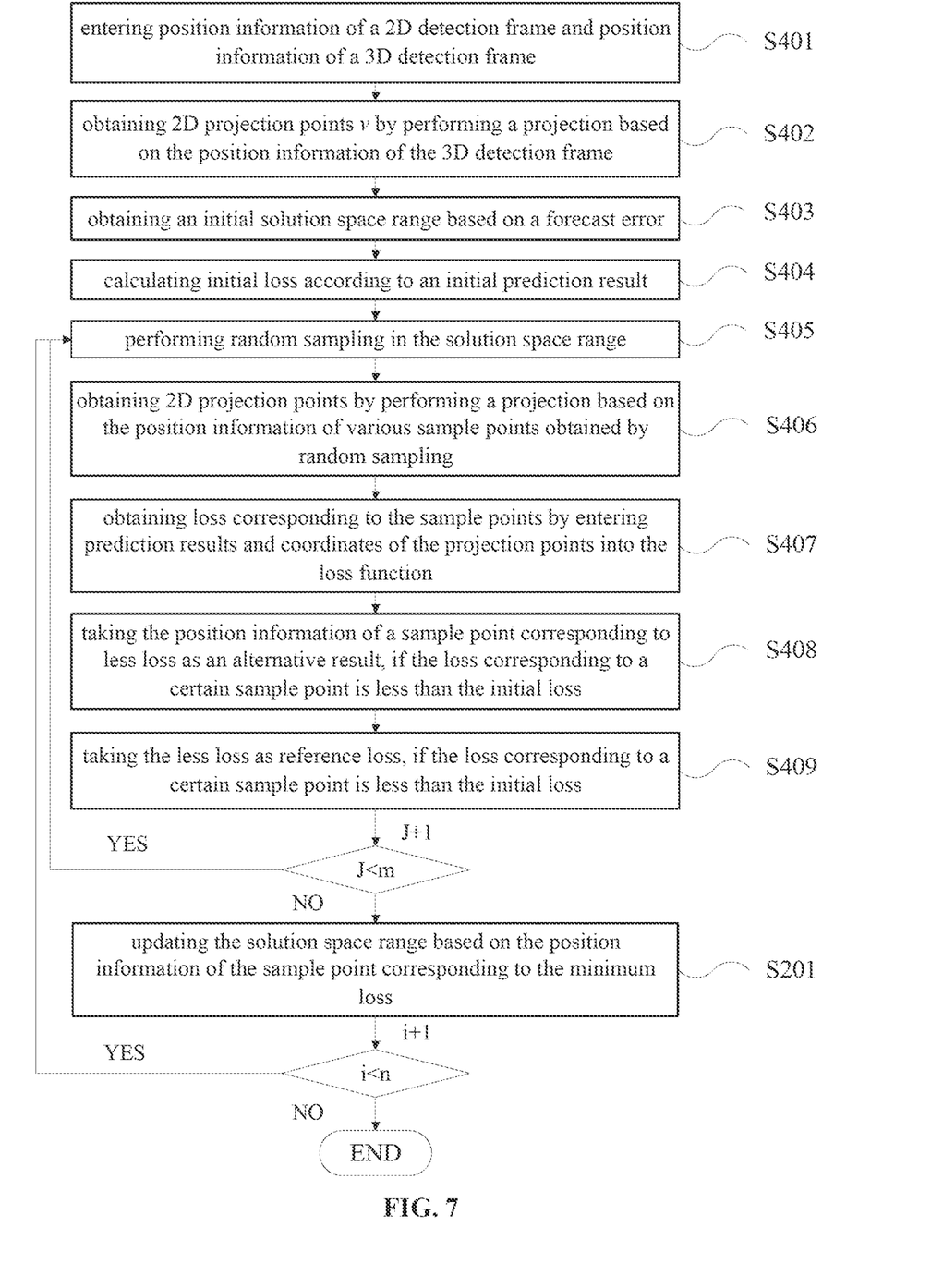
FIG. 7 is a flowchart showing an application example of an obstacle detection method according to yet another embodiment of the present application.

For example, as shown in FIG. 7, the process of solving the optimal solution may include the following steps:

S401, entering position information of a 2D detection frame, [x1,x2,y1,y2], and position information of a 3D detection frame, [x3d,y3d,z3d,w3d,h3d,l3d,ry3d], p2,de_norm.

S402, obtaining 2D projection points v by performing a projection based on the position information of the 3D detection frame.

S403, obtaining an initial solution space range based on a forecast error [x3d$_{mean}$, y3d$_{mean}$, z3d$_{mean}$, ry3d$_{mean}$]. An example is as follows:

$$x3d_{min}=x3d-x3d_{mean}, x3d_{max}=x3d+x3d_{mean};$$

$$y3d_{min}=y3d-y3d_{mean}, y3d_{max}=y3d-y3d_{mean};$$

$$z3d_{min}=z3d-z3d_{mean}, z3d_{max}=z3d-z3d_{mean},$$

$$ry3d_{min}=ry3d-ry3d_{mean}, ry3d_{max}=ry3d-ry3d_{mean}.$$

S404, calculating initial loss of according to an initial prediction result ([x1, x2, y1, y2], v, [x1$_{pro}$, x2$_{pro}$, y1$_{pro}$, y2$_{pro}$]).

S405, performing random sampling in the solution space range, if the number of times of resampling i<n, and an exemplary value range of sample points $\widetilde{x3d}, \widetilde{y3d}, \widetilde{z3d}, \widetilde{ry3d}$ obtained by the random sampling, is as follows:

$$\widetilde{x3d} \in [x3d_{min}, x3d_{max}];$$

$$\widetilde{y3d} \in [y3d_{min}, y3d_{max}];$$

$$\widetilde{z3d} \in [z3d_{min}, z3d_{max}];$$

$$\widetilde{ry3d} \in [ry3d_{min}, ry3d_{max}].$$

If the number of times of random sampling (or the number of sample points) j<m, the random sampling continues. Each time a sample point is obtained by sampling, j+1. Until j=m, the resampling is over, and i+1.

S406, obtaining 2D projection points by performing a projection based on the position information ($\widetilde{x3d}, \widetilde{y3d}, \widetilde{z3d}$, w3d,h3d,l3d, $\widetilde{ry3d}$, p2,de_norm) of various sample points obtained by random sampling.

S407, obtaining loss corresponding to the sample points $\widehat{ol}$ err([x1,x2,y1,y2], [x1$_{pro}$,x2$_{pro}$,y1$_{pro}$,y2$_{pro}$],v,$\hat{v}$)) by entering prediction results and coordinates of the projection points into the loss function.

S408, taking the position information of a sample point corresponding to less loss as an alternative result, if the loss corresponding to a certain sample point is less than the initial loss ($\widehat{ol}$ <ol). Examples are as follows:

$$x3d \leftarrow \widetilde{x3d}$$

$$y3d \leftarrow \widetilde{y3d}$$

$$z3d \leftarrow \widetilde{z3d}$$

$$ry3d \leftarrow \widetilde{ry3d}$$

S409, taking the less loss as reference loss (ol← $\widehat{ol}_{min}$) if the loss corresponding to a certain sample point is less than the initial loss. Otherwise, ol is kept unchanged.

S410, updating the solution space range based on the position information of the sample point corresponding to the minimum loss. Examples are as follows:

$$x3d_{min}=\min(\widetilde{x3d}), x3d_{max}=\max(\widetilde{x3d});$$

$$y3d_{min}=\min(\widetilde{y3d}), y3d_{max}=\max(\widetilde{y3d});$$

$$z3d_{min}=\min(\widetilde{z3d}), z3d_{max}=\max(\widetilde{z3d});$$

$$ry3d_{min}=\min(\widetilde{ry3d}), ry3d_{max}=\max(\widetilde{ry3d}).$$

Where n represents the number of times of resampling, and m represents the number of the sample points each time sampling is performed.

In this embodiment, by applying multiple constraint items, conditions that an optimal solution should satisfy may be sufficiently taken into account, the sampling rate of optimal solutions may be increased by applying a random search. Compared with the precision of initial solutions, the precision of final search results is greatly improved. The method according to an embodiment of the present application may be applied to a scene where a position of a 3D obstacle is sensed at roadside, and may also be applied to a scene where an on-board camera or other surveillance cameras and the like are applicable.

Figure 8:
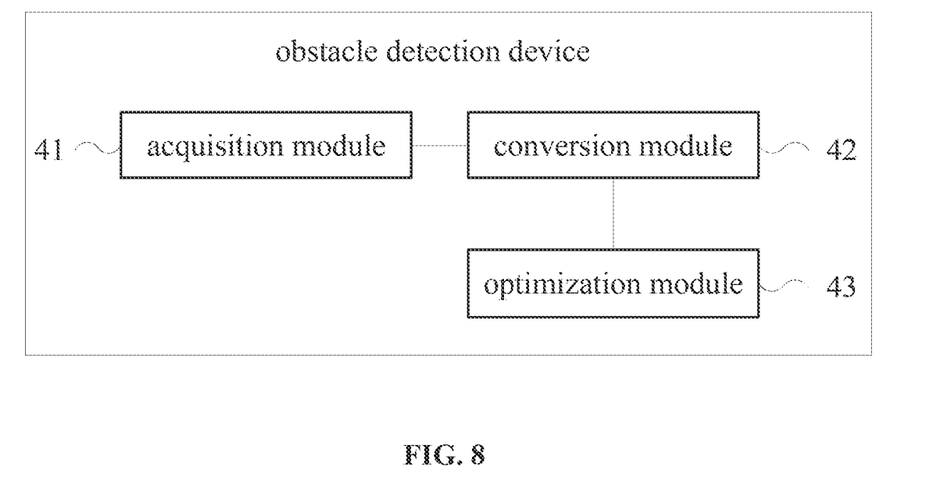
FIG. 8 is a block diagram showing an obstacle detection device according to an embodiment of the present application.

FIG. 8 is a block diagram showing an obstacle detection device according to an embodiment of the present application. The device may include:

an acquisition module 41, configured to acquire position information of a two-dimensional detection frame and position information of a three-dimensional detection frame of an obstacle in an image;

a conversion module 42, configured to convert the position information of the three-dimensional detection frame of the obstacle into position information of a two-dimensional projection frame of the obstacle:

an optimization module 43, configured to optimize the position information of the three-dimensional detection frame of the obstacle by using the position information of the two-dimensional detection frame, the position information of the three-dimensional detection frame and the position information of the two-dimensional projection frame of the obstacle in the image.

Figure 9:
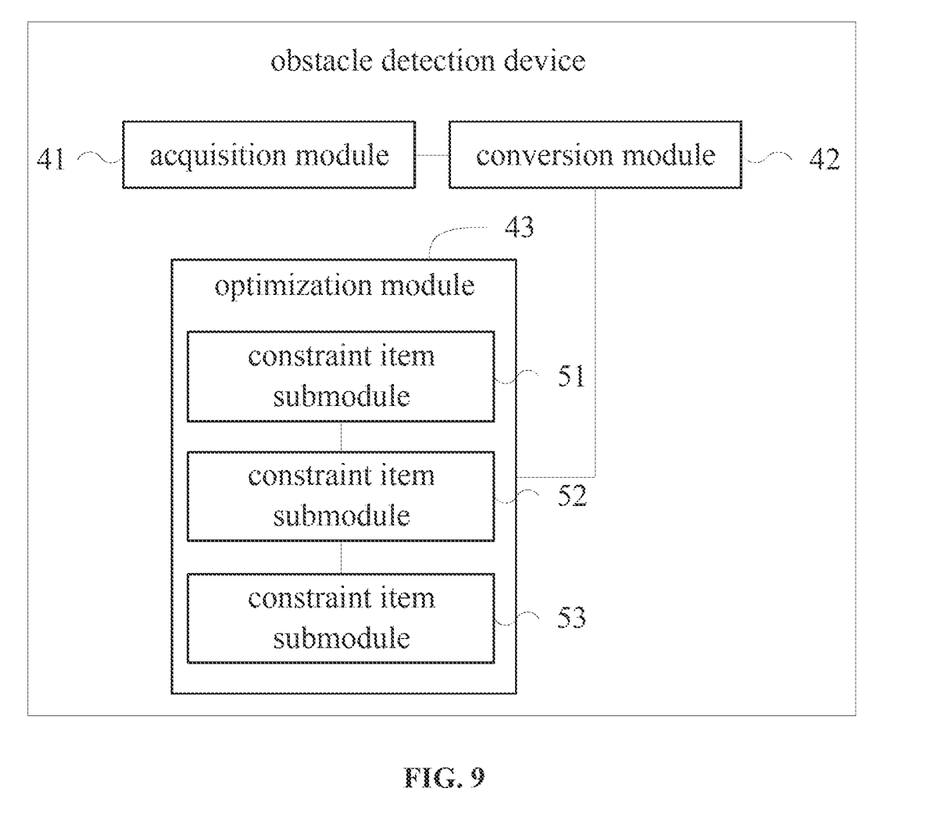
FIG. 9 is a block diagram showing an obstacle detection device according to another embodiment of the present application.

In a possible implementation, as shown in FIG. 9, the optimization module 43 includes:

a constraint item submodule 51, configured to set at least one constraint item for the position information of the three-dimensional detection frame of the obstacle by using the position information of the two-dimensional detection frame, the position information of the three-dimensional detection frame and the position information of the two-dimensional projection frame of the obstacle in the image;

a loss function submodule 52, configured to construct a loss function by using the constraint item:

an optimization submodule 53, configured to optimize the position information of the three-dimensional detection frame of the obstacle by using the loss function.

In a possible implementation, the constraint item includes a first constraint item, which is set according to coordinates of a central point of the two-dimensional detection frame and coordinates of a central point of the two-dimensional projection frame of the obstacle.

In a possible implementation, the constraint item further includes a second constraint item, which is set according to coordinates of left and right sides of the two-dimensional detection frame and coordinates of left and right sides of the two-dimensional projection frame of the obstacle.

In a possible implementation, the constraint item further includes a third constraint item, which is set according to coordinates of projection points of the three-dimensional detection frame of the obstacle.

In a possible implementation, the optimization submodule is specifically configured to:

calculate initial loss, by using an initial prediction result of the three-dimensional detection frame of the obstacle and the loss function, as a reference loss;

set an initial solution space range according to a prediction error;

perform random sampling m times within the initial solution space range, to obtain a set of position information of three-dimensional detection frames associated with sample points, wherein m is an integer greater than 0;

calculate loss associated with the sample points according to the loss function;

compare the loss associated with the sample points and the reference loss, to obtain a sample point with minimum loss, and take position information of a three-dimensional detection frame associated with the sample point with the minimum loss as an alternative result, and take loss associated with the sample point with the minimum loss as an updated reference loss.

In a possible implementation, the optimization submodule is further configured to perform following steps repeatedly for n−1 times, wherein n represents a number of times resampling is performed:

determining statistically a distribution range of sample points with loss less than the reference loss from m sample points resampled last time, to obtain an updated solution space range;

performing random sampling m times within the updated solution space range, to obtain a set of position information of three-dimensional detection frames of the obstacle associated with sample points, wherein m is an integer greater than 0;

calculating loss associated with the sample points according to the loss function;

comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

For functions of modules in devices according to embodiments of the present application, reference may be made to corresponding descriptions of the above method, and thus a detailed description thereof is omitted herein.

According to an embodiment of the present application, an electronic apparatus and a readable storage medium are provided in the present application.

Figure 10:
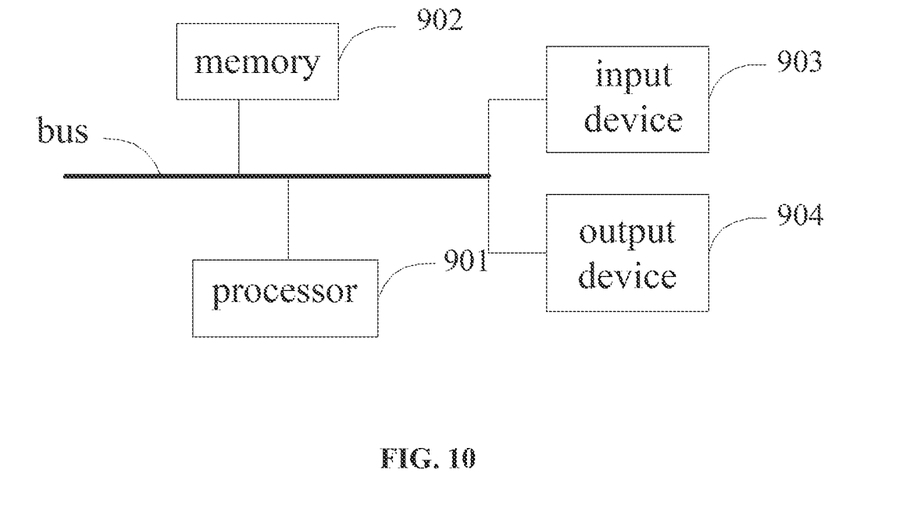
FIG. 10 is a block diagram showing an electronic apparatus for implementing an obstacle detection method according to an embodiment of the present application.

FIG. 10 is a block diagram showing an electronic apparatus for implementing an obstacle detection method according to an embodiment of the present application. The electronic apparatus is intended to represent various forms of digital computers, such as laptop computers, desktop computers, workbenches, personal digital assistants, servers, blade servers, mainframe computers, and other suitable computers. The electronic apparatus may also represent various forms of mobile devices, such as personal digital processors, cellular phones, intelligent phones, wearable devices, and other similar computing devices. Components shown in the present application, their connections and relations, and their functions are merely examples, and are not intended to limit the implementation of the application described and/or required herein.

As shown in FIG. 10, the electronic apparatus includes: one or more processors 901, a memory 902, and interfaces for connecting various components, including a high-speed interface and a low-speed interface. The various components are interconnected using different buses and may be mounted on a common motherboard or otherwise installed as required. The processor may process instructions executed within the electronic apparatus, including instructions for storing in or on a memory, to display graphical information of a Graphical User Interface (GUI) on an external input/output device (such as a display device coupled to the interface). In other implementations, multiple processors and/or multiple buses may be used with multiple memories and multiple memories, if desired. Similarly, multiple electronic apparatuses may be connected, each apparatus providing some of the necessary operations (for example, as a server array, a group of blade servers, or a multiprocessor system). In FIG. 10, one processor 901 is shown as an example.

The memory 902 is a non-transitory computer-readable storage medium provided in the present application. The memory stores instructions executable by at least one processor, so that the at least one processor executes an obstacle detection method provided in the present application. The non-transitory computer-readable storage medium of the present application stores computer instructions, which are configured to enable a computer to execute an obstacle detection method provided in the present application.

As a non-transitory computer-readable storage medium, the memory 902 may be used to store non-transitory software programs, non-transitory computer executable programs, and modules, such as program instructions/modules corresponding to an obstacle detection method in embodiments of the present application (e.g., the acquisition module 41, the conversion module 42 and the optimization module 43 as shown in FIG. 8). The processor 901 executes various functional applications and data processing of the server by running non-transitory software programs, instructions, and modules stored in the memory 902, that is, to implement an above obstacle detection method in foregoing method embodiments.

The memory 902 may include a storage program area and a storage data area, where the storage program area may be used to store an application program required by an operating system or for at least one function; the storage data area may be used to store data created according to the use of an electronic device for implementing an obstacle detection method. In addition, the memory 902 may include a high-speed random-access memory, and may also include a non-transitory memory, such as at least one magnetic disk storage device, a flash memory device, or other non-transitory solid-state storage device. In some embodiments, the memory 902 may optionally include a memory set remotely relative to the processor 901, and these remote memories may be connected to the electronic apparatus for implementing an obstacle detection method through a network Examples of the above network include, but are not limited to, an Internet, an intranet, a local area network, a mobile communication network, and combinations thereof.

An electronic apparatus applied with an obstacle detection method may further include an input device 903 and an output device 904. The processor 901, the memory 902, the input device 903 and the output device 904 may be connected through a bus or in other manners. In FIG. 10, a connection through a bus is shown as an example.

The input device 903 may receive input numeric or character information, and generate key signal inputs related to a user setting and a function control of an electronic apparatus applied with an obstacle detection method, such as a touch screen, a keypad, a mouse, a trackpad, a touchpad, a pointing stick, one or more mouse buttons, a trackball, a joystick and other input devices. The output device 904 may include a display device, an auxiliary lighting device (for example, an LED), a haptic feedback device (for example, a vibration motor), and the like. The display device may include, but is not limited to, a Liquid Crystal Display (LCD), a Light Emitting Diode (LED) display, and a plasma display. In some implementations, the display device may be a touch screen.

Various implementations of the systems and technologies described herein may be implemented in a digital electronic circuit system, an integrated circuit system, an application specific integrated circuit (ASIC), a computer hardware, a firmware, a software, and/or combinations thereof. These various implementations may include: implementations in one or more computer programs, where the one or more computer programs are executable and/or interpretable on a programmable system including at least one programmable processor, programmable processor, where the programmable processor may be a dedicated or general-purpose programmable processor that may receive data and instructions from a storage system, at least one input device, and at least one output device, and may transmit the data and instructions to the storage system, the at least one input device, and the at least one output device.

These computing programs (also known as programs, software, software applications, or codes) include machine instructions of a programmable processor and may be implemented by using a high-level procedural and/or object-oriented programming language, and/or an assembly/machine language. As used herein, the terms "machine-readable medium" and "computer-readable medium" refer to any computer program product, apparatus, and/or device used to provide machine instructions and/or data to a programmable processor (for example, a magnetic disk, an optical disk, a memory, and a programmable logic device (PLD)), including machine-readable media that receives machine instructions as machine-readable signals. The term "machine-readable signal" refers to any signal used to provide machine instructions and/or data to a programmable processor.

In order to provide an interaction with a user, systems and techniques described herein may be implemented on a computer, where the computer includes: a display device (for example, a Cathode Ray Tube (CRT) or liquid crystal display (LCD) monitor) for displaying information to a user; and a keyboard and pointing device (such as a mouse or a trackball) through which a user may provide input to a computer. Other kinds of devices may also be used to provide interaction with a user. For example, a feedback provided to a user may be a sensory feedback in any form (for example, a visual feedback, an auditory feedback, or a haptic feedback), and a user input (including an acoustic input, a voice input, or a tactile input) may be received in any form.

The systems and technologies described herein may be implemented in a computing system including a background component (for example, as a data server), a computing system including a middleware component (for example, an application server), or a computing system including a front-end component (for example, a user computer with a graphical user interface or a web browser, through which the user may interact with an implementation of the systems and technologies described herein), or a computer system including any combination of such a background component, a middleware component, or a front-end component. The components of the system may be interconnected by any form or medium of digital data communication (such as, a communication network). Examples of a communication network include a Local Area Network (LAN), a Wide Area Network (WAN), and the Internet.

A computer systems may include a client and a server. The client and the server are generally remote from each other and typically interact through a communication network. A client-server relation is generated by performing computer programs running on respective computers and having a client-server relation with each other.

By applying technical solution of embodiments of the present application, a loss function is constructed by using position information of a 2D detection frame, position information of a 3D detection frame and position information of a 2D projection frame of an obstacle in an image, to optimize position information of the 3D detection frame of the obstacle, so that accuracy of results of predicting a 3D position of an obstacle may be improved. For example, the obstacle detection method according to an embodiment of the present application may be applied to a scene where a position of a 3D obstacle is sensed at roadside, and may also be applied to a scene where an on-board camera or other surveillance cameras and the like are applicable.

It should be understood the steps in the various processes described above may be reordered or omitted, or other steps may be added therein. For example, the steps described in the application may be performed parallelly, sequentially, or in different orders, as long as the desired results of the technical solutions disclosed in the application may be achieved, to which no limitation is made herein.

The embodiments above do not constitute a limitation on the protection scope of the present application. It should be understood by those skilled in the art that various modifications, combinations, sub-combinations, and substitutions may be available according to design requirements and other factors. Any modifications, equivalent replacements and improvements made within the spirit and principle of the present application shall be covered within the protection scope of the present application.

What is claimed is:

1. An obstacle detection method, comprising:
   acquiring position information of a two-dimensional detection frame and position information of a three-dimensional detection frame of an obstacle in an image;

converting the position information of the three-dimensional detection frame of the obstacle into position information of a two-dimensional projection frame of the obstacle; and optimizing the position information of the three-dimensional detection frame of the obstacle by using the position information of the two-dimensional detection frame, the position information of the three-dimensional detection frame and the position information of the two-dimensional projection frame of the obstacle in the image, wherein the optimizing the position information of the three-dimensional detection frame of the obstacle by using the position information of the two-dimensional detection frame, the position information of the three-dimensional detection frame and the position information of the two-dimensional projection frame of the obstacle in the image comprises:

setting at least one constraint item for the position information of the three-dimensional detection frame of the obstacle by using the position information of the two-dimensional detection frame, the position information of the three-dimensional detection frame and the position information of the two-dimensional projection frame of the obstacle in the image;

constructing a loss function by using the constraint item; and optimizing the position information of the three-dimensional detection frame of the obstacle by using the loss function, wherein the constraint item comprises a first constraint item, which is set according to coordinates of a central point of the two-dimensional detection frame and coordinates of a central point of the two-dimensional projection frame of the obstacle.

2. The obstacle detection method according to claim 1, wherein the constraint item further comprises a second constraint item, which is set according to coordinates of left and right sides of the two-dimensional detection frame and coordinates of left and right sides of the two-dimensional projection frame of the obstacle.

3. The obstacle detection method according to claim 1, wherein the constraint item further comprises a third constraint item, which is set according to coordinates of projection points of the three-dimensional detection frame of the obstacle.

4. The obstacle detection method according to claim 1, wherein the optimizing the position information of the three-dimensional detection frame of the obstacle by using the loss function comprises:

calculating initial loss, by using an initial prediction result of the three-dimensional detection frame of the obstacle and the loss function, as a reference loss;

setting an initial solution space range according to a prediction error;

performing random sampling m times within the initial solution space range, to obtain a set of position information of three-dimensional detection frames associated with sample points, wherein m is an integer greater than 0;

calculating loss associated with the sample points according to the loss function; and comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

5. The obstacle detection method according to claim 4, wherein the optimizing the position information of the three-dimensional detection frame of the obstacle by using the loss function further comprises performing following operations repeatedly for n−1 times, wherein n represents a number of times resampling is performed:

determining statistically a distribution range of sample points with loss less than the reference loss from m sample points resampled last time, to obtain an updated solution space range;

performing random sampling m times within the updated solution space range, to obtain a set of position information of three-dimensional detection frames of the obstacle associated with sample points, wherein m is an integer greater than 0;

calculating loss associated with the sample points according to the loss function; and comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

6. The obstacle detection method according to claim 1, wherein the optimizing the position information of the three-dimensional detection frame of the obstacle by using the loss function further comprises performing following operations repeatedly for n−1 times, wherein n represents a number of times resampling is performed:

determining statistically a distribution range of sample points with loss less than the reference loss from m sample points resampled last time, to obtain an updated solution space range;

performing random sampling m times within the updated solution space range, to obtain a set of position information of three-dimensional detection frames of the obstacle associated with sample points, wherein m is an integer greater than 0;

calculating loss associated with the sample points according to the loss function; and comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

7. An obstacle detection device, comprising:

at least one processor; and a memory communicatively connected to the at least one processor, wherein the memory stores instructions executable by the at least one processor, the instructions are executed by the at least one processor to enable the at least one processor to:

acquire position information of a two-dimensional detection frame and position information of a three-dimensional detection frame of an obstacle in an image;

convert the position information of the three-dimensional detection frame of the obstacle into position information of a two-dimensional projection frame of the obstacle; and optimize the position information of the three-dimensional detection frame of the obstacle by using the position information of the two-dimensional detection frame, the position information of the three-dimensional detection frame and the position information of the two-dimensional projection frame of the obstacle in the image, wherein the instructions are executed by the at least one processor to further enable the at least one processor to:

set at least one constraint item for the position information of the three-dimensional detection frame of the obstacle by using the position information of the two-dimensional detection frame, the position information of the three-dimensional detection frame and the position information of the two-dimensional projection frame of the obstacle in the image;

construct a loss function by using the constraint item; and optimize the position information of the three-dimensional detection frame of the obstacle by using the loss function, wherein the constraint item comprises a first constraint item, which is set according to coordinates of a central point of the two-dimensional detection frame and coordinates of a central point of the two-dimensional projection frame of the obstacle.

8. The obstacle detection device according to claim 7, wherein the constraint item further comprises a second constraint item, which is set according to coordinates of left and right sides of the two-dimensional detection frame and coordinates of left and right sides of the two-dimensional projection frame of the obstacle.

9. The obstacle detection device according to claim 7, wherein the constraint item further comprises a third constraint item, which is set according to coordinates of projection points of the three-dimensional detection frame of the obstacle.

10. The obstacle detection device according to claim 7, wherein the instructions are executed by the at least one processor to further enable the at least one processor to:

calculate initial loss, by using an initial prediction result of the three-dimensional detection frame of the obstacle and the loss function, as a reference loss;

set an initial solution space range according to a prediction error;

perform random sampling m times within the initial solution space range, to obtain a set of position information of three-dimensional detection frames associated with sample points, wherein m is an integer greater than 0;

calculate loss associated with the sample points according to the loss function; and compare the loss associated with the sample points and the reference loss, to obtain a sample point with minimum loss, and take position information of a three-dimensional detection frame associated with the sample point with the minimum loss as an alternative result, and take loss associated with the sample point with the minimum loss as an updated reference loss.

11. The obstacle detection device according to claim 10, wherein the instructions are executed by the at least one processor to further enable the at least one processor to perform following operations repeatedly for n−1 times, wherein n represents a number of times resampling is performed:

determining statistically a distribution range of sample points with loss less than the reference loss from m sample points resampled last time, to obtain an updated solution space range;

performing random sampling m times within the updated solution space range, to obtain a set of position information of three-dimensional detection frames of the obstacle associated with sample points, wherein m is an integer greater than 0;

calculating loss associated with the sample points according to the loss function; and comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

12. The obstacle detection device according to claim 7, wherein the instructions are executed by the at least one processor to further enable the at least one processor to perform following operations repeatedly for n−1 times, wherein n represents a number of times resampling is performed:

determining statistically a distribution range of sample points with loss less than the reference loss from m sample points resampled last time, to obtain an updated solution space range;

performing random sampling m times within the updated solution space range, to obtain a set of position information of three-dimensional detection frames of the obstacle associated with sample points, wherein m is an integer greater than 0;

calculating loss associated with the sample points according to the loss function; and comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

13. A non-transitory computer readable storage medium for storing computer instructions, wherein the computer instructions, when executed by a computer, cause the computer to acquire position information of a two-dimensional detection frame and position information of a three-dimensional detection frame of an obstacle in an image;

convert the position information of the three-dimensional detection frame of the obstacle into position information of a two-dimensional projection frame of the obstacle; and optimize the position information of the three-dimensional detection frame of the obstacle by using the position information of the two-dimensional detection frame, the position information of the three-dimensional detection frame and the position information of the two-dimensional projection frame of the obstacle in the image, wherein the computer instructions, when executed by a computer, further cause the computer to:

set at least one constraint item for the position information of the three-dimensional detection frame of the obstacle by using the position information of the two-dimensional detection frame, the position information of the three-dimensional detection frame and the position information of the two-dimensional projection frame of the obstacle in the image;

construct a loss function by using the constraint item; and
optimize the position information of the three-dimensional detection frame of the obstacle by using the loss function,
wherein the constraint item comprises a first constraint item, which is set according to coordinates of a central point of the two-dimensional detection frame and coordinates of a central point of the two-dimensional projection frame of the obstacle.

14. The non-transitory computer-readable storage medium according to claim 13, wherein the constraint item further comprises a second constraint item, which is set according to coordinates of left and right sides of the two-dimensional detection frame and coordinates of left and right sides of the two-dimensional projection frame of the obstacle.

15. The non-transitory computer-readable storage medium according to claim 13, wherein the constraint item further comprises a third constraint item, which is set according to coordinates of projection points of the three-dimensional detection frame of the obstacle.

16. The non-transitory computer-readable storage medium according to claim 13, wherein the computer instructions, when executed by a computer, further cause the computer to:
   calculate initial loss, by using an initial prediction result of the three-dimensional detection frame of the obstacle and the loss function, as a reference loss;
   set an initial solution space range according to a prediction error;
   perform random sampling m times within the initial solution space range, to obtain a set of position information of three-dimensional detection frames associated with sample points, wherein m is an integer greater than 0;
   calculate loss associated with the sample points according to the loss function; and
   compare the loss associated with the sample points and the reference loss, to obtain a sample point with minimum loss, and take position information of a three-dimensional detection frame associated with the sample point with the minimum loss as an alternative result, and take loss associated with the sample point with the minimum loss as an updated reference loss.

17. The non-transitory computer-readable storage medium according to claim 16, wherein the computer instructions, when executed by a computer, further cause the computer to perform following operations repeatedly for n−1 times, wherein n represents a number of times resampling is performed:
   determining statistically a distribution range of sample points with loss less than the reference loss from m sample points resampled last time, to obtain an updated solution space range;
   performing random sampling m times within the updated solution space range, to obtain a set of position information of three-dimensional detection frames of the obstacle associated with sample points, wherein m is an integer greater than 0;
   calculating loss associated with the sample points according to the loss function; and
   comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

18. The non-transitory computer-readable storage medium according to claim 13, wherein the computer instructions, when executed by a computer, further cause the computer to perform following operations repeatedly for n−1 times, wherein n represents a number of times resampling is performed:
   determining statistically a distribution range of sample points with loss less than the reference loss from m sample points resampled last time, to obtain an updated solution space range;
   performing random sampling m times within the updated solution space range, to obtain a set of position information of three-dimensional detection frames of the obstacle associated with sample points, wherein m is an integer greater than 0;
   calculating loss associated with the sample points according to the loss function; and
   comparing the loss associated with the sample points and the reference loss, to obtain a sample point with minimum loss, and taking position information of a three-dimensional detection frame associated with the sample point with the minimum loss as an alternative result, and taking loss associated with the sample point with the minimum loss as an updated reference loss.

* * * * *